US011447274B2

(12) United States Patent
Umemura et al.

(10) Patent No.: US 11,447,274 B2
(45) Date of Patent: Sep. 20, 2022

(54) LIQUID BEHAVIOR SUPPRESSION DEVICE

(71) Applicant: Japan Aerospace Exploration Agency, Tokyo (JP)

(72) Inventors: Yutaka Umemura, Tokyo (JP); Mayu Matsumoto, Tokyo (JP)

(73) Assignee: JAPAN AEROSPACE EXPLORATION AGENCY

( * ) Notice: Subject to any disclaimer, the term of this patent is extended or adjusted under 35 U.S.C. 154(b) by 240 days.

(21) Appl. No.: 16/756,626

(22) PCT Filed: Oct. 25, 2018

(86) PCT No.: PCT/JP2018/039757
§ 371 (c)(1),
(2) Date: Apr. 16, 2020

(87) PCT Pub. No.: WO2019/082989
PCT Pub. Date: May 2, 2019

(65) Prior Publication Data
US 2020/0255166 A1    Aug. 13, 2020

(30) Foreign Application Priority Data
Oct. 26, 2017  (JP) .............................. JP2017-207427

(51) Int. Cl.
*B64G 1/40*     (2006.01)
*B65D 90/52*    (2006.01)
*F02K 9/60*     (2006.01)

(52) U.S. Cl.
CPC .................................. *B64G 1/402* (2013.01)

(58) Field of Classification Search
CPC ........ B64G 1/402; B64G 1/405; B64G 1/002; B64G 1/40; F02K 9/605; F02K 9/60; F05D 2250/191; B65D 90/52; F03H 1/0037
See application file for complete search history.

(56) References Cited

U.S. PATENT DOCUMENTS

| 4,768,541 A *   | 9/1988 | Uney ..................... B64G 1/402 137/154 |
| 2006/0145022 A1* | 7/2006 | Buehler .................... F02K 9/50 244/172.2 |
| 2010/0107601 A1* | 5/2010 | Valentian .................. F02K 9/52 60/257 |

(Continued)

FOREIGN PATENT DOCUMENTS

| CN | 102991729 A | 3/2013 |
| CN | 104533662 A | 4/2015 |

(Continued)

OTHER PUBLICATIONS

International Search Report dated Jan. 22, 2019 in corresponding PCT International Application No. PCT/JP2018/039757.

(Continued)

*Primary Examiner* — Jeffrey P Aiello
(74) *Attorney, Agent, or Firm* — Ostrolenk Faber LLP (57) ABSTRACT

A liquid behavior suppression device in which the inside of a liquid container is partitioned in a direction orthogonal to the central axis, liquid is held on the bottom side of the liquid container, and a plurality of holes extending in the axial direction are formed.

6 Claims, 7 Drawing Sheets

(56) References Cited

U.S. PATENT DOCUMENTS

2014/0203148 A1* 7/2014 Barthoulot ............. B64G 1/401
                                                                              60/221
2016/0311559 A1* 10/2016 Hu ...................... F17C 13/008
2017/0283096 A1* 10/2017 Kawahara ............ F17C 13/008

FOREIGN PATENT DOCUMENTS

| GB | 2166103 | A | * | 10/1984 | ............. | B64G 1/38 |
|----|---------|---|---|---------|---|----------|
| GB | 2166103 | A |   | 4/1986  |   |          |
| JP | 57-123784 | U |   | 8/1982  |   |          |
| JP | 07-187099 | A |   | 7/1995  |   |          |
| JP | 11-099996 | A |   | 4/1999  |   |          |
| JP | 2007-191174 | A |   | 8/2007  |   |          |
| JP | 2010-523877 | A |   | 7/2010  |   |          |
| JP | 2014-519578 | A |   | 8/2014  |   |          |

OTHER PUBLICATIONS

Written Opinion dated Jan. 22, 2019 in corresponding PCT International Application No. PCT/JP2018/039757.
Takehiro Himeno, "Liquid Motion in the Propellant Tanks of Space Vehicles, The Japan Society of Fluid Mechanics," pp. 239-244, Jun. 2013, along with an English language translation.
European Search Report, dated Jul. 1, 2021, issued in corresponding European Patent Application No. 18870604.8. Total 7 pages.

* cited by examiner

LIQUID BEHAVIOR SUPPRESSION DEVICE

CROSS-REFERENCE TO RELATED APPLICATIONS

The present application is a 35 U.S.C. §§ 371 national phase conversion of PCT/JP2018/039757, filed Oct. 25, 2018, which claims priority to Japanese Patent Application No. 2017-207427, filed Oct. 26, 2017, the contents of which are incorporated herein by reference. The PCT International Application was published in the Japanese language.

TECHNICAL FIELD

The present invention relates to a liquid behavior suppression device.

BACKGROUND ART

In the related art, a technique to suppress the behavior of a liquid in a liquid container is required.

As an example, in a spacecraft navigating under a microgravitational environment, in order to smoothly supply a liquid propellant containing a liquid fuel and a liquid oxidizer to an engine or a thruster, it is required to suppress the behavior of the liquid propellant, and prevent gas in the liquid container from being supplied to the engine or the thruster.

As the suppression of the behavior of the liquid propellant, for example, a configuration where the liquid propellant is separated from the gas by a partition wall having elasticity is adopted (refer to the following PTL 1).

In addition, for example, a configuration where a structure such as a channel (refer to the following PTL 2) or a vane (refer to the following NPL 1) for holding the liquid propellant by using the surface tension of the liquid propellant is arranged in the liquid container so as to keep the liquid propellant in the vicinity of a pipe leading to the engine or the thruster is adopted.

In addition, for example, a settling method for separating the liquid propellant from the gas by causing an auxiliary thruster to exert microacceleration on the spacecraft is adopted (refer to the following PTL 3).

CITATION LIST

Patent Literature

[PTL 1] Japanese Unexamined Patent Application, First Publication No. H7-187099
[PTL 2] Published Japanese Translation No. 2010-523877 of the PCT International Publication
[PTL 3] Published Japanese Translation No. 2014-519578 of the PCT International Publication

Non-Patent Literature

[NPL 1] "Prediction of behavior of liquid propellant of liquid rocket", Japan Society of Fluid Mechanics, June 2013, P239-P244, and written by Takeno Himeno

DISCLOSURE OF INVENTION

Technical Problem

As described above, PTL 1 to PTL 3 and NPL 1 are provided as an example of the technique to suppress the behavior of the liquid in the container.

However, in the configuration disclosed in PTL 1, there are difficulties in selecting the material of the partition wall capable of withstanding a cryogenic temperature environment and the installation of the partition wall increases the weight of the liquid container, which is a problem. In addition, in the configurations disclosed in PTL 2 and NPL 1, the arrangement of the structure such as a channel or a vane in the liquid container increases the weight of the liquid container, which is a problem.

In addition, in the configuration disclosed in PTL 3, a liquid propellant for exerting microacceleration on the spacecraft is separately required, and in a case where the weight of a body of the spacecraft is large, since a large thrust force is required to exert the microacceleration, a larger amount of the liquid propellant is required; and thereby increasing the weight of the liquid propellant, which is a problem.

The present invention is made in light of the foregoing circumstances, and an object of the present invention is to provide a liquid behavior suppression device that suppresses the behavior of a liquid.

Solution to Problem

In order to solve the foregoing problems, the present invention has the following configuration.

According to the present invention, there is provided a liquid behavior suppression device that partitions an inside of a liquid container in a direction orthogonal to a central axis and holds a liquid on a bottom side of the liquid container, in which a plurality of holes are formed to penetrate the liquid behavior suppression device in an axial direction.

In the liquid behavior suppression device according to the present invention, the plurality of holes may be arranged in a mesh pattern in a radial direction in the liquid container.

The liquid behavior suppression device according to the present invention may further include an annular portion (annular member) that is arranged in an outer peripheral edge portion of the liquid behavior suppression device to extend along the outer peripheral edge portion.

In the liquid behavior suppression device according to the present invention, the plurality of holes may be arranged to form a radial pattern around the central axis.

In the liquid behavior suppression device according to the present invention, sizes of the plurality of holes in the radial direction may differ from each other.

In the liquid behavior suppression device according to the present invention, sizes of the plurality of holes in a circumferential direction may differ from each other.

Advantageous Effects of Invention

According to the liquid behavior suppression devices of the present invention, it is possible to suppress the behavior of the liquid.

BRIEF DESCRIPTION OF DRAWINGS

FIG. 6(a) is a plan view, FIG. 6(b) is a cross-sectional view taken along a line B-B, and FIG. 6(c) is a cross-sectional view taken along a line C-C for a liquid behavior suppression device according to a third embodiment of the present invention.

FIG. 10(a) is a view showing the behavior of the liquid propellant after $t_{11}$ seconds from the start of turning, FIG. 10(b) is a view showing the behavior of the liquid propellant after $t_{12}$ seconds from the start of turning, FIG. 10(c) is a view showing the behavior of the liquid propellant after $t_{13}$ seconds from the start of turning, and FIG. 10(d) is a view showing the behavior of the liquid propellant after $t_{14}$ seconds from the start of turning in computational analysis of a third example.

BEST MODE FOR CARRYING OUT THE INVENTION

Hereinafter, embodiments of the present invention will be described. However, the present invention is not limited to the following embodiments.

First Embodiment

Hereinafter, a liquid behavior suppression device 1 according to a first embodiment of the present invention will be described with reference to FIGS. 1 and 2. In the following description, the liquid behavior suppression device 1 which is used in a liquid container 100 accommodating a liquid propellant (liquid) 50 in a spacecraft navigating under a microgravitational environment will be provided as an example.

Figure 1:
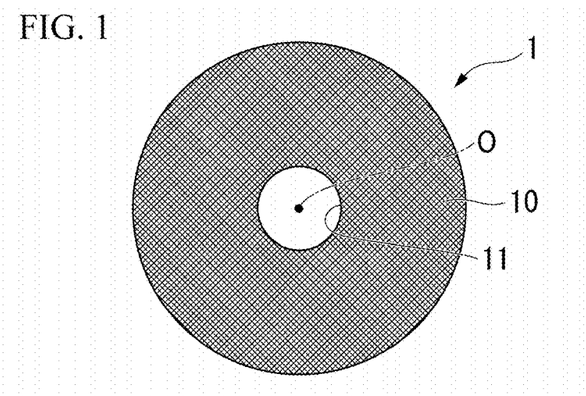
FIG. 1 is a plan view of a liquid behavior suppression device according to a first embodiment of the present invention.
Figure 2:
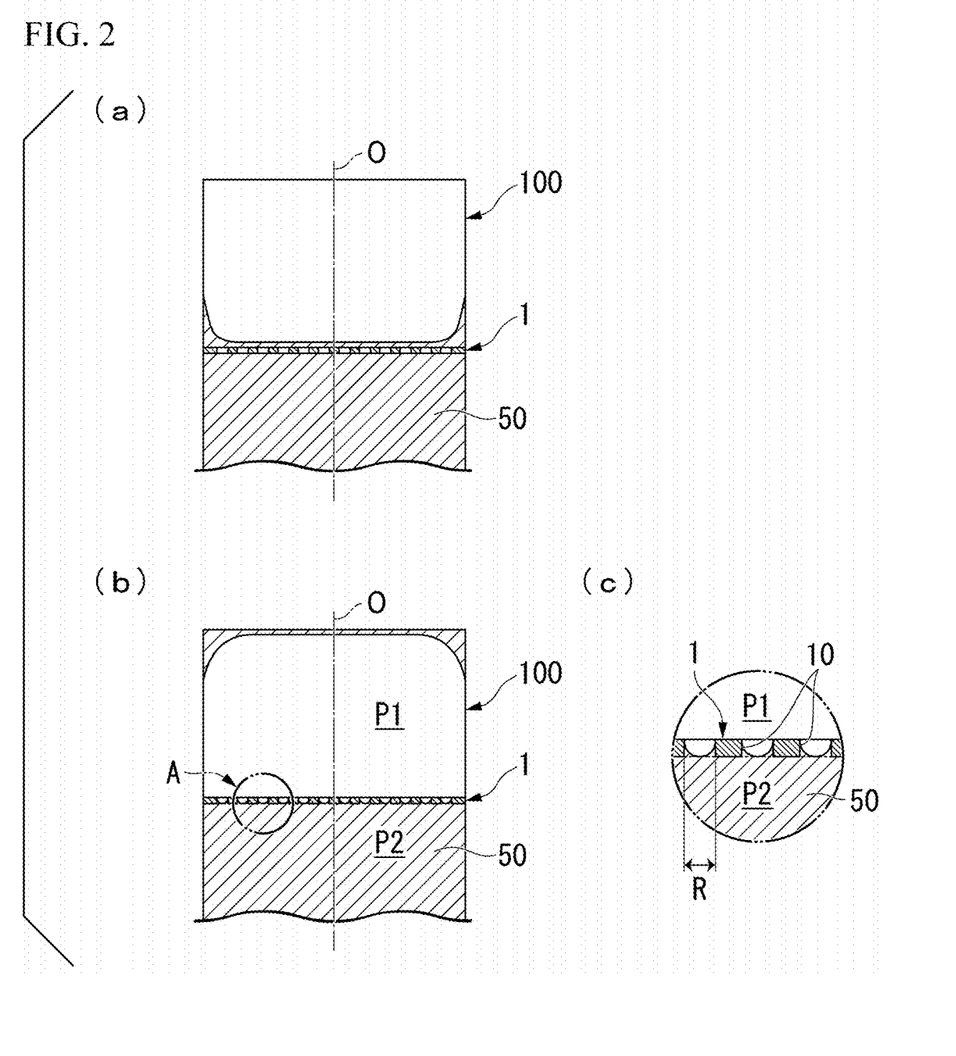
FIG. 2(a) is a view showing a state where a liquid propellant flows along an inner surface of a liquid container.
FIG. 2(b) is a view showing a state where the position of a gas-liquid interface is the same as that of the liquid behavior suppression device in an axial direction.
FIG. 2(c) is an enlarged view of a portion A in FIG. 2(b), in the view shown in FIG. 1 describing the operation of the liquid behavior suppression device.

As shown in FIGS. 1 and 2, the liquid behavior suppression device 1 according to the present embodiment partitions the inside of the liquid container 100 in a direction orthogonal to a central axis O, and holds a liquid on a bottom side along an axial direction of the liquid container 100 (hereinafter, simply referred to as a bottom side). The liquid behavior suppression device 1 according to the present embodiment is a member that "fractionates a gas-liquid interface in a direction intersecting the direction of acceleration exerted on the liquid container 100" and "generates a surface tension at the fractionated gas-liquid interface".

The liquid behavior suppression device 1 is arranged in the liquid container 100 having, for example, a cylindrical shape. In the following description, the direction along the central axis O of the liquid container 100 is referred as an axial direction, the direction orthogonal to the central axis O is referred to as a radial direction, and the direction around the central axis O is referred to as a circumferential direction.

The liquid behavior suppression device 1 has an annular shape in a plan view. An opening 11 is formed in a central portion of the liquid behavior suppression device 1 in the radial direction. The opening 11 communicates with a top portion side in the axial direction of the liquid container 100 (side opposite to a bottom, hereinafter simply referred to as a top portion side), and the bottom side. The opening 11 is a portion with low pumping resistance in the liquid container 100 which is required to supply the liquid propellant 50 from the bottom to a thruster or the like.

The position of the liquid behavior suppression device 1 in the axial direction is fixed with respect to the liquid container 100. In this state, the liquid behavior suppression device 1 is arranged in the liquid propellant 50. In particular, the liquid behavior suppression device 1 is positioned closer to the bottom side than the liquid surface (hereinafter, referred to as the gas-liquid interface) of the liquid propellant 50. Incidentally, as the liquid propellant 50 is reduced, the liquid behavior suppression device 1 becomes positioned closer to the top portion side than the gas-liquid interface.

Then, in the present embodiment, a plurality of holes 10 are formed in the liquid behavior suppression device 1 to penetrate therethrough in the axial direction. The liquid behavior suppression device 1 has a mesh structure where the mesh stretches vertically and horizontally. With this mesh structure, the holes 10 which are very small are uniformly formed across the entire region of the liquid behavior suppression device 1. For this reason, the plurality of holes 10 are arranged in a mesh pattern in the radial direction in the liquid container 100. It is possible to appropriately change the opening area of the hole 10 depending on the properties or the like of the liquid propellant 50.

Subsequently, the operation of the liquid behavior suppression device 1 will be described.

Incidentally, the operation when a spacecraft equipped with the liquid container 100 navigates under the microgravitational environment will be described.

Under the microgravitational environment, the inertia force exerted on the liquid propellant 50 decreases, and thus, the influence of the surface tension on the liquid propellant 50 increases. Therefore, as shown in FIG. 2(a), the wettability of an inner surface of the liquid container 100 with respect to the liquid propellant 50 increases, and the liquid propellant 50 moves along the inner surface of the liquid container 100 toward the top portion side. At the time, the liquid propellant 50 flows toward the top portion side through the plurality of holes 10 of the liquid behavior suppression device 1.

As the liquid propellant 50 moves toward the top portion side, a space on the bottom side below the liquid behavior suppression device 1 in the liquid container 100 is depressurized, and a space on the top portion side is relatively pressurized. As shown in FIG. 2(b), when the height of the gas-liquid interface becomes the same as that of the holes 10 of the liquid behavior suppression device 1, the holes 10 prevent the liquid from passing therethrough. At the time, a surface tension σ which can be obtained by an equation (1) occurs at the gas-liquid interface positioned in the holes 10 (refer to FIG. 2(*c*)).

$$P1-P2=\sigma/A \quad (1)$$

Here, P1: pressure of the top portion side (N/mm$^2$), P2: pressure of the bottom side (N/mm$^2$), σ: surface tension (N), and A: cross-sectional area (opening area) of the hole 10 orthogonal to the central axis O (mm$^2$).

Then, in a case where the thruster of the spacecraft generates a thrust force when the spacecraft navigates under the microgravitational environment, an inertia force induced by acceleration is exerted toward the top portion side on the liquid container 100 and the liquid propellant 50.

In this case, the surface tension 6 occurs at the gas-liquid interface positioned in the holes 10, and thus, a force to cause the liquid propellant 50 to flow toward the top portion side through the holes 10, the force being generated by the inertia force which is induced by the acceleration of the thrust force generated by the thruster, opposes the surface tension σ occurring at the gas-liquid interface in the holes 10. For this reason, in the liquid container 100, the liquid propellant 50 on the bottom side is prevented from passing through the holes 10 to flow toward the top portion side, or the gas on the top portion side is prevented from passing through the holes 10 toward the bottom side.

As described above, according to the liquid behavior suppression device 1 in the present embodiment, the plurality of holes 10 are formed in the liquid behavior suppression device 1. For this reason, when the inertia force which is induced by acceleration toward the top portion side is exerted on the liquid propellant 50, the liquid propellant 50 flows toward the top portion side through a part of the plurality of holes 10 due to the influence of the inertia force or the exertion of the surface tension σ on the wall surface. Therefore, the region on the bottom side below the liquid behavior suppression device 1 is depressurized in the liquid container 100.

Then, a pressure difference between the top portion side and the bottom side in the liquid container 100 is received by the gas-liquid interface on which the surface tension 6 is strongly exerted in the holes 10, and thus, the liquid propellant 50 is prevented from moving from the bottom side toward the top portion side in the liquid container 100. Therefore, in addition, the gas is prevented from moving from the top portion side toward the bottom side. As a result, it is possible to suppress the behavior of the liquid propellant 50.

In addition, since the plurality of holes 10 are formed in the liquid behavior suppression device 1, it is possible to suppress the weight of the liquid behavior suppression device 1; and thereby, it is possible to suppress an increase in the weight of the liquid container 100 which is caused due to the arrangement of the liquid behavior suppression device 1 therein.

In addition, the liquid behavior suppression device 1 can be made of a material having a predetermined rigidity, and is not required to be made of an elastic material such as a diaphragm. Therefore, the liquid behavior suppression device 1 can easily have durability suitable for a cryogenic temperature environment.

In addition, the plurality of holes 10 are arranged at different positions in the radial direction. For this reason, when the inertia force which is induced by acceleration straight along the axial direction is exerted on the liquid propellant 50, it is possible to prevent the gas in the liquid container 100 from flowing toward the bottom side through the holes 10 on the inside in the radial direction while allowing the liquid propellant 50 to easily flow along the inner surface of the liquid container 100 through the holes 10 on the outside in the radial direction.

Second Embodiment

Subsequently, a second embodiment of the present invention will be described with reference to FIG. 3.

Incidentally, the same reference signs will be assigned to the same portions in the present embodiment as the configuration elements according to the first embodiment, the description thereof will be omitted, and only the points of difference will be described. In addition, the description of the same operation will also be omitted.

Figure 3:
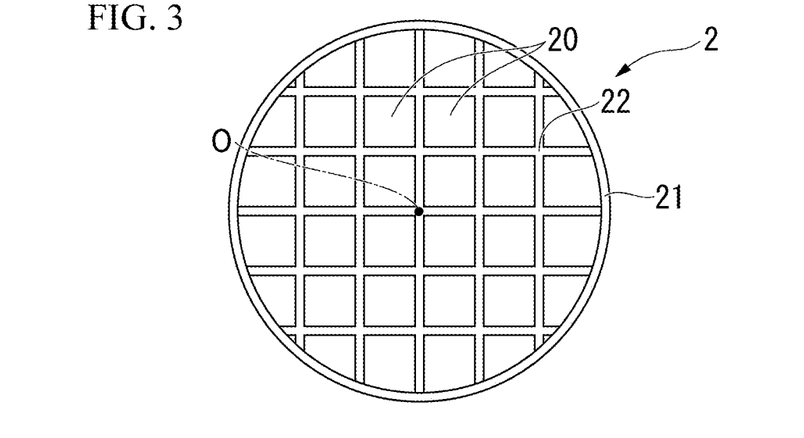
FIG. 3 is a plan view of a liquid behavior suppression device according to a second embodiment of the present invention.

FIG. 3 is a plan view of a liquid behavior suppression device 2 according to the second embodiment of the present invention.

As shown in FIG. 3, the liquid behavior suppression device 2 includes annular portion (annular member) 21 that is arranged in an outer peripheral edge portion to extend along the outer peripheral edge portion, and a grid portion 22 that is connected to an inner peripheral edge portion of the annular portion 21.

The annular portion 21 extends across the entire periphery. The grid portion 22 includes bars that extend orthogonal to each other in a plan view and defines holes 20, each of which has a rectangular shape in a plan view.

The annular portion 21 and the grid portion 22 are integrally formed. In the shown example, the annular portion 21 extends continuously across the entire periphery. Incidentally, a part of the annular portion 21 in a circumferential direction may be missing. In the liquid behavior suppression device 2, the weight is reduced by further increasing the opening area of the hole 20 compared to that in the configuration having a mesh structure as in the liquid behavior suppression device 1 according to the first embodiment. The opening 11 according to the first embodiment is not formed in the liquid behavior suppression device 2. In the liquid behavior suppression device 2, since the opening area of the hole 20 can be secured, the hole 20 serves also as a portion with low pumping resistance in the liquid container 100.

Subsequently, the operation of the liquid behavior suppression device 2 will be described.

Under the micro gravitational environment, when the liquid propellant 50 moves toward the top portion side of the liquid container 100 along the inner surface of the liquid container 100, the liquid propellant 50 interferes with the annular portion 21, and thus, the movement of the liquid propellant 50 toward the top portion side is partially blocked. Therefore, it is possible to suppress a large amount of the liquid propellant 50 from moving toward the top portion side, and it is possible to suppress the gas on the top portion side from passing through the holes 20 toward the bottom side.

In addition, at the time, the gas-liquid interface of the liquid propellant 50 may oscillate (sloshing) periodically in the radial direction. In this case, the liquid propellant 50 repeatedly collides with a lower surface that faces the bottom side in an outer surface of the annular portion 21; and thereby, it is possible to suppress such oscillation. Namely, the annular portion 21 can have the function of a baffle plate for suppressing the sloshing of the liquid propellant 50.

As described above, according to the liquid behavior suppression device 2 in the present embodiment, the annular portion 21 is arranged in the outer peripheral edge portion of the liquid behavior suppression device 2. For this reason, the flow of the liquid propellant 50 from the holes 20 on the outside in the radial direction along the inner surface of the liquid container 100 is partially blocked by the annular portion 21; and thereby, it is possible to reduce the outflow amount of the liquid propellant 50 toward the top portion side, and as a result, it is possible to regulate the amount of the liquid propellant 50 passing through the holes 20.

Therefore, in the liquid behavior suppression device 2 of which the weight reduction is realized by increasing the opening area of the hole 20, it is possible to effectively suppress an excessive increase in the amount of the liquid propellant 50 passing through the holes 20 which is caused by the increase in the opening area.

In addition, since the annular portion 21 is provided as a baffle plate, it is possible to suppress the gas-liquid interface of the liquid propellant 50 from oscillating periodically in the radial direction which is caused by the inertia force induced by acceleration exerted from outside, and it is possible to more effectively suppress the behavior of the liquid propellant 50.

Here, a modified example of the liquid behavior suppression device 2 will be described.

Figure 4:
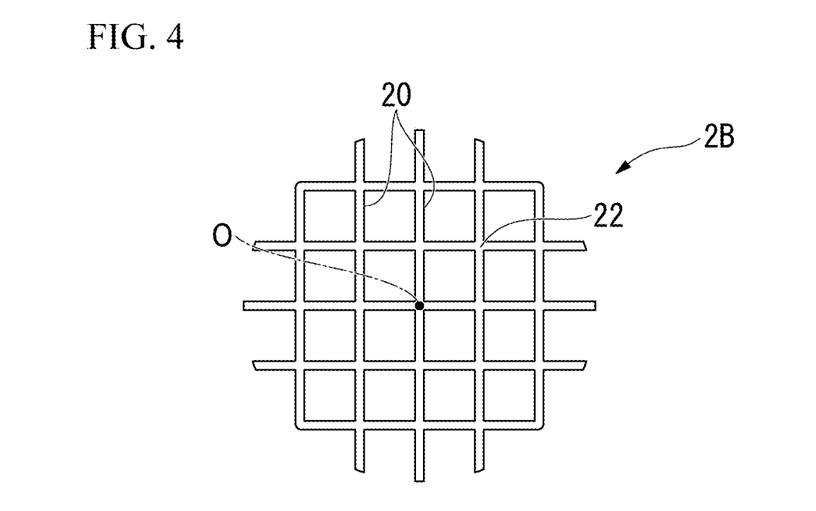
FIG. 4 is a modified example of the liquid behavior suppression device shown in FIG. 3.

FIG. 4 is a plan view of the modified example of the liquid behavior suppression device 2.

As shown in FIG. 4, a liquid behavior suppression device 2B according to the present modified example does not include the annular portion 21. For this reason, compared to the configuration including the annular portion 21, it is possible to further reduce the weight of the liquid behavior suppression device 2B. Therefore, it is possible to more effectively suppress an increase in the weight of the liquid container 100 which is cause by the arrangement of the liquid behavior suppression device 2B.

In addition, since the annular portion 21 is not provided, the liquid propellant 50 does not interfere with the annular portion 21, and it is possible to increase the outflow amount of the liquid propellant 50 flowing along the inner surface of the liquid container 100. As a result, it is possible to regulate the amount of the liquid propellant 50 passing through the holes 20.

Third Embodiment

Figure 5:
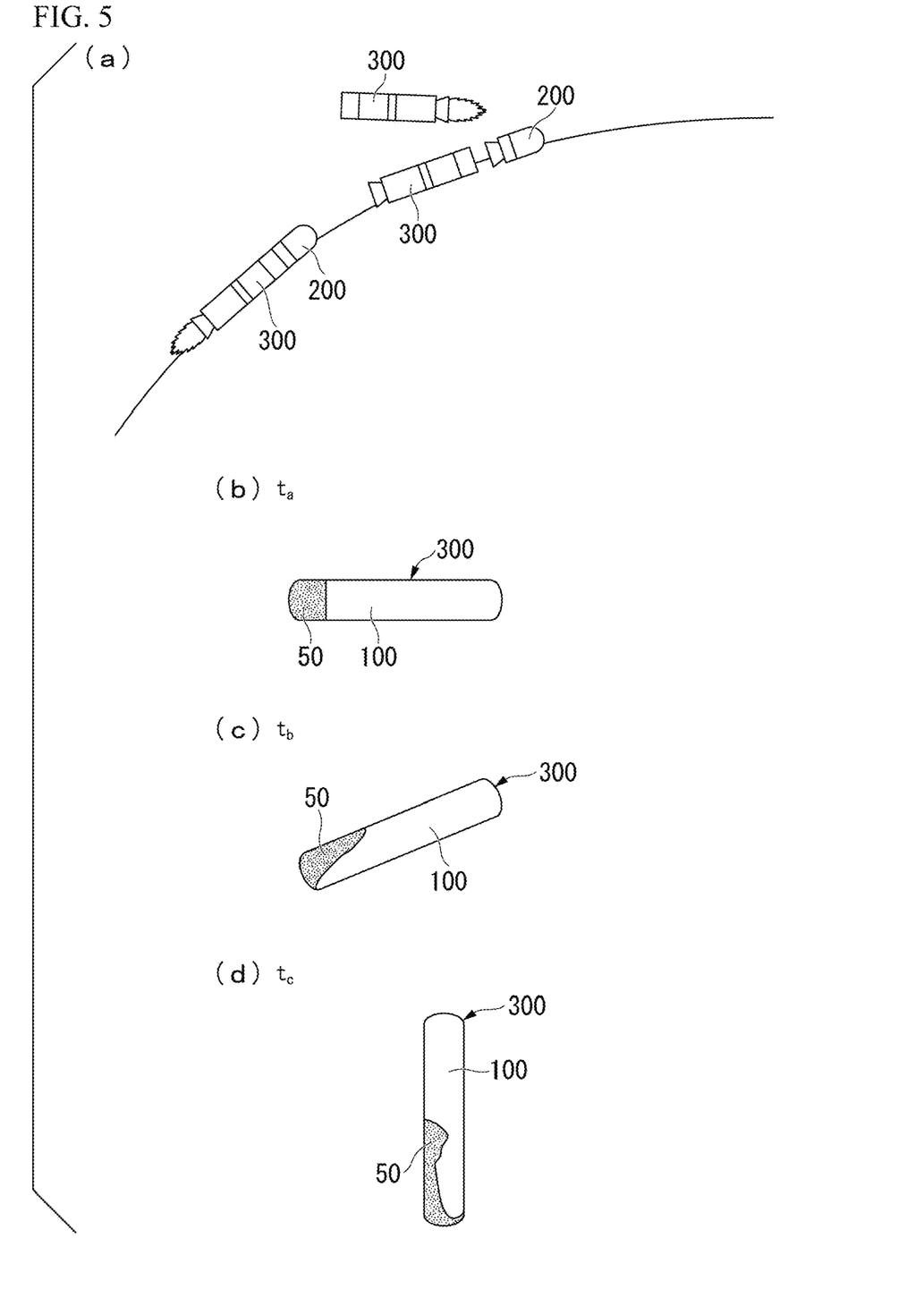
FIG. 5(a) is a view showing the navigation trajectory of a spacecraft.
FIG. 5(b) is a view showing the behavior of the liquid propellant after to seconds from the start of turning of a lower-stage rocket.
FIG. 5(c) is a view showing the behavior of the liquid propellant after $t_b$ seconds from the start of turning of the lower-stage rocket.
FIG. 5(d) is a view showing the behavior of the liquid propellant after $t_c$ seconds from the start of turning of the lower-stage rocket.
Figure 6:
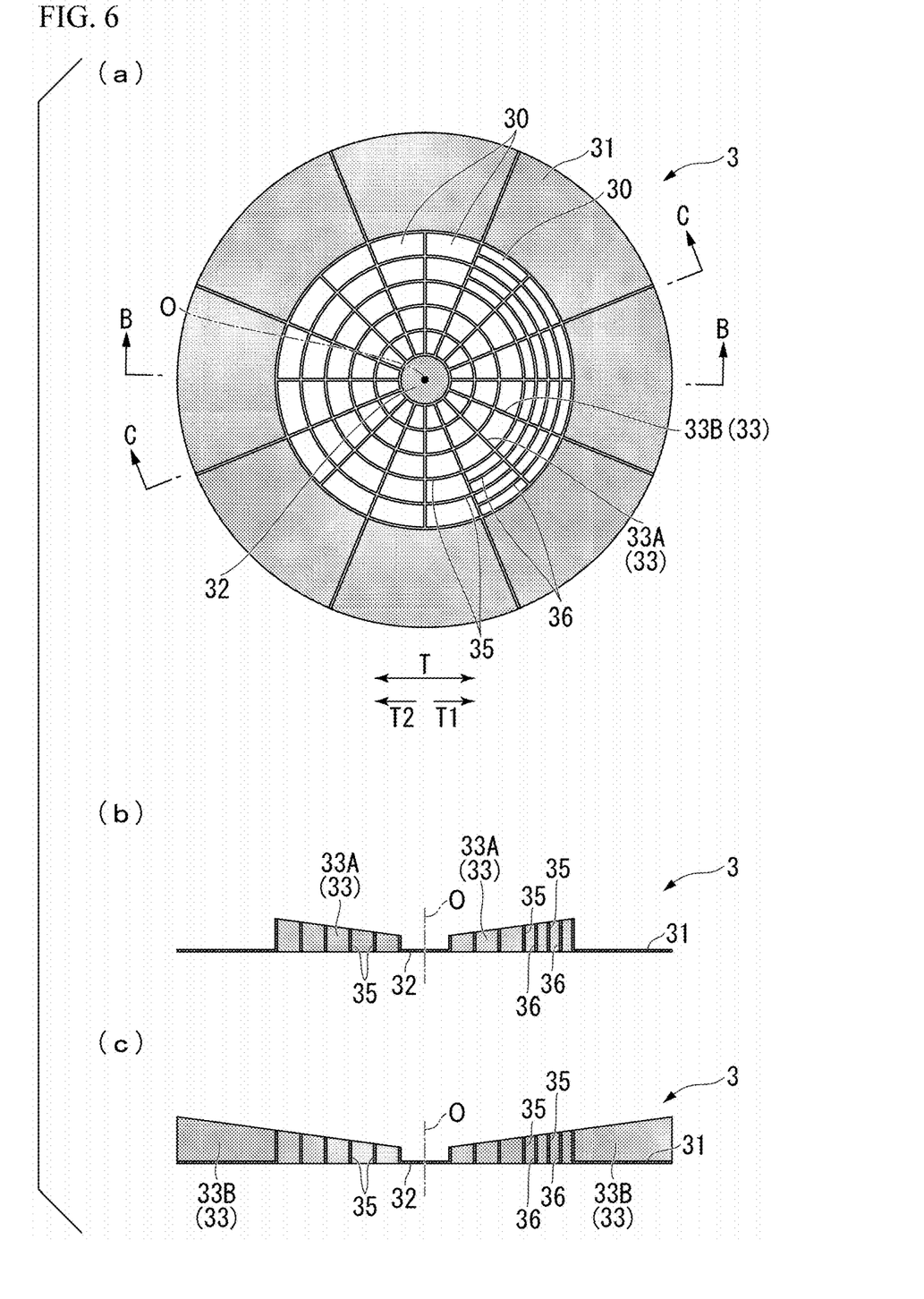

Subsequently, a third embodiment of the present invention will be described with reference to FIGS. 5 and 6.

Incidentally, the same reference signs will be assigned to the same portions in the present embodiment as the configuration elements according to the second embodiment, the description thereof will be omitted, and only the points of difference will be described. In addition, the description of the same operation will also be omitted.

FIG. 5(a) is a view showing the navigation trajectory of a spacecraft, and FIG. 5(b) is a view showing the behavior of the liquid propellant after $t_a$ seconds from the start of turning of a lower-stage rocket 300. In addition, FIG. 5(c) is a view showing the behavior of the liquid propellant after $t_b$ seconds from the start of turning of the lower-stage rocket 300, and FIG. 5(d) is a view showing the behavior after $t_c$ seconds from the start of turning of the lower-stage rocket 300. Incidentally, it is assumed that time elapses in order of $t_a$ seconds, $t_b$ seconds, and $t_c$ seconds from the start of turning.

In the first embodiment and the second embodiment described above, the configurations where the behavior of the liquid propellant 50 with respect to the inertia force which is induced by acceleration exerted in the axial direction is suppressed have been described. On the other hand, as shown in FIG. 5(a), for example, the navigating spacecraft separates an upper-stage rocket 200 from the lower-stage rocket 300 in a multi-stage rocket to turn the lower-stage rocket 300.

In such case, as shown in FIG. 5(b) and FIG. 5(c), for example, an inertia force which is induced by acceleration in the direction intersecting the axial direction may be exerted on the liquid propellant 50 in the liquid container 100 of the lower-stage rocket 300.

For example, as shown in FIG. 5(d), when the behavior of the liquid propellant 50 changes significantly, there is a possibility that the center of gravity of the entire spacecraft may become unstable, or the supply of the liquid propellant 50 to a thruster may be disrupted.

Then, in the present embodiment, a configuration for effectively suppressing the behavior of the liquid propellant 50 with respect to not only the inertia force which is induced by acceleration in the axial direction but also the inertia force which is induced by acceleration in the direction intersecting the axial direction will be described.

FIG. 6(a) is a plan view, FIG. 6(b) is a cross-sectional view taken along a line B-B, and FIG. 6(c) is a cross-sectional view taken along a line C-C for the liquid behavior suppression device according to the third embodiment of the present invention.

As shown in FIG. 6(a), a liquid behavior suppression device 3 includes an annular portion 31 that is arranged in an outer peripheral edge portion to extend along the outer peripheral edge portion; a central plate 32 that is arranged in a central portion in the radial direction and has a circular shape in a plan view; a coupling portion 33 that is connected to the central plate 32 and extends in the radial direction; and a partition wall 35 that is connected to the coupling portion 33 and extends entirely in the circumferential direction.

The annular portion 31 includes front and back surfaces facing the axial direction, and has a planar shape extending in the radial direction. The size of the annular portion 31 in the radial direction is the same as the size of a portion in the radial direction in which holes 30 are arranged in the liquid behavior suppression device 3.

The annular portion 31 is connected to the inner surface of the liquid container 100. Incidentally, the size of the annular portion 31 in the radial direction can be arbitrary changed. It is possible to improve the function of a baffle plate for suppressing the foregoing sloshing by increasing the size of the annular portion 31 in the radial direction.

The central plate 32 is coaxially arranged with the central axis O.

A plurality of the coupling portions 33 are arranged with a gap therebetween in the circumferential direction. The coupling portion 33 couples the annular portion 31 to the central plate 32 in the radial direction. The plurality of coupling portions 33 are arranged in a radial pattern around the central axis O. A plurality of the partition walls 35 are arranged with a gap therebetween in the radial direction. A plurality of the holes 30 are defined by the plurality of coupling portions 33 and the plurality of partition walls 35. The plurality of holes 30 are arranged to form a radial pattern around the central axis O.

As shown in FIGS. 6(b) and 6(c), the sizes of the plurality of coupling portions 33 in the radial direction differ from each other depending on the position thereof in the circumferential direction.

The plurality of coupling portions 33 include first coupling portions 33A that couples the central plate 32 to an inner peripheral edge portion of the annular portion 31 as shown in FIG. 6(b), and second coupling portions 33B that couples the central plate 32 to an outer peripheral edge portion of the annular portion 31 as shown in FIG. 6(c). The first coupling portions 33A and the second coupling portions 33B are alternately arranged in the circumferential direction. Since the coupling portion 33 includes the first coupling portion 33A, it is possible to suppress the weight of the entirety of the liquid behavior suppression device 3.

In addition, the sizes of the plurality of holes 30 in the radial direction differ from each other. In the shown example, among the plurality of holes 30, the sizes of the holes 30 in the radial direction which are positioned on one side T1 in one direction (hereinafter, referred to as a turning direction T) in the radial direction are smaller than the sizes of the holes 30 in the radial direction which are positioned on the other side T2 in the turning direction T.

The liquid behavior suppression device 3 includes an auxiliary partition wall 36 extending in the circumferential direction. The auxiliary partition wall 36 is arranged on one side T1 in the turning direction T. A central angle with respect to the central axis O as a center between both end portions of the auxiliary partition wall 36 in the circumferential direction is 180° or less.

A central portion of the auxiliary partition wall 36 in the circumferential direction is positioned at the outermost location on one side T1 in the turning direction T. In the shown example, two auxiliary partition walls 36 are provided. The two auxiliary partition walls 36 are arranged to be biased to one side T1 in the turning direction T.

The two auxiliary partition walls 36 are separately arranged between the partition walls 35 adjacent to each other in the radial direction and between the partition wall 35 and the inner peripheral edge portion of the annular portion 31.

The hole 30 which is defined between the partition walls 35 adjacent to each other in the radial direction is subdivided by the auxiliary partition wall 36. In particular, the size of the hole 30 in the radial direction which is defined between the partition wall 35 and the auxiliary partition wall 36 is smaller than the size of the hole 30 in the radial direction which is defined between the partition walls 35 adjacent to each other in the radial direction.

In other words, among the plurality of holes 30, the opening areas of the holes 30 which are positioned on one side T1 in the turning direction T are smaller than the opening areas of the holes 30 which are positioned on the other side T2 in the turning direction T.

Incidentally, for example, an auxiliary coupling portion extending in the radial direction may be arranged between the coupling portions 33 adjacent to each other in the circumferential direction such that the sizes of the plurality of holes 30 in the circumferential direction differ from each other and the opening areas of the plurality of holes 30 differ from each other.

Subsequently, the operation of the liquid behavior suppression device 3 will be described.

Firstly, when an inertia force which is induced by acceleration toward the top portion side is exerted on the liquid propellant 50, as described in the first embodiment, the liquid propellant 50 can be allowed to pass through and prevented from passing through each of the holes 30 that are arranged to form a radial pattern.

Then, when an inertia force which is induced by acceleration in the direction intersecting the axial direction is exerted on the liquid propellant 50 from one side T1 toward the other side T2 in the turning direction T, the liquid propellant 50 receives the force toward the other side T2 in the turning direction T which makes the liquid propellant 50 to attempt to pass through the holes 30, which are positioned on the other side T2 in the turning direction T, toward the top portion side of the liquid container 100.

In this case, among the plurality of holes 30, the opening areas of the holes 30 which are positioned on one side T1 in the turning direction T are smaller than the opening areas of the holes 30 which are positioned on the other side T2 in the other side T2 in the turning direction T.

For this reason, according to the foregoing equation (1), it is possible to increase the surface tension 6 exerted on the gas-liquid interface in the holes 30 which are positioned on one side T1 in the turning direction T; and thereby, it is possible to prevent the gas from passing through the holes 30, which are positioned on one side T1 in the turning direction T, toward the bottom side. Therefore, it is possible to prevent the liquid propellant 50 from passing through the holes 30, which are positioned on the other side T2 in the turning direction T, toward the top portion side.

As described above, in the liquid behavior suppression device 3 according to the present embodiment, the plurality of holes 30 are arranged to form a radial pattern around the central axis O of the liquid container 100. For this reason, regardless of the positions in the circumferential direction, it is possible to uniformly suppress the behavior of the liquid propellant 50 with respect to the inertia force which is induced by acceleration in the axial direction. In addition, since the shape of the liquid behavior suppression device 3 in the circumferential direction is uniform, it is possible to secure the manufacturability of the liquid behavior suppression device 3.

In addition, the sizes of the plurality of holes 30 in the radial direction differ from each other. For this reason, also when the inertia forces which are induced by acceleration not only in the axial direction but also toward the radial direction in addition to the axial direction are exerted on the liquid propellant 50, owing to the surface tension σ described above which occurs in peripheral edge portions of the holes 30, it is possible to effectively prevent the gas in the liquid container 100 from flowing toward the bottom side.

In addition, in a case where the sizes of the holes 30 in the circumferential direction differ from each other, also when the inertia forces which are induced by acceleration not only in the axial direction but also toward the circumferential direction in addition to the axial direction are exerted on the liquid propellant 50, owing to the surface tension σ described above which occurs in the peripheral edge portions of the holes 30, it is possible to effectively prevent the gas in the liquid container 100 from flowing toward the bottom side.

As described above, in the present embodiment, the opening area of the hole 30, which uses the surface tension which is strongly exerted on the liquid propellant 50 under the microgravitational environment to allow and prevent the passing of the liquid propellant 50 and the gas of which the flow is caused by a pressure difference in the liquid container 100, differs depending on the position in the radial direction or in the circumferential direction. Therefore, the behavior of the liquid propellant 50 with respect to the inertia force which is induced by acceleration in the direction intersecting the axial direction is suppressed; and thereby, it is possible to supply the liquid propellant 50 to the thruster to restart the thruster, while significantly changing the posture of the spacecraft.

In addition, it is considered that the foregoing effect is more effective when the inertia force which is induced by acceleration generated by a thrust force from the thruster is small, and a transport spacecraft for exploration such as a lunar lander can be also anticipated to adopt this liquid behavior suppression device. Furthermore, from the viewpoint of improving the degree of freedom in changing the posture of the spacecraft, this liquid behavior suppression device can contribute to adopting a navigation route or an operation which is not feasible in the spacecraft until now.

(Verification Result)

Subsequently, the verification results of the foregoing effects in the first embodiment and the second embodiment will be described.

In verification tests, the liquid container 100 in which the liquid behavior suppression device 1 according to the first embodiment was arranged was adopted as a first example, and the liquid container 100 in which the liquid behavior suppression device 2 according to the second embodiment was arranged was adopted as a second example. In addition, the liquid container 100 in which the liquid behavior suppression device was not arranged was adopted as a first comparative example.

Then, in a state where each of the liquid containers 100 was free-dropped inside a drop tower to be put under the microgravitational environment, the behavior of the liquid propellant 50 when an inertia force induced by acceleration toward the top portion side was exerted thereon was observed. In addition, in the liquid containers 100 according to the first comparative example and the second example, the behavior of the liquid propellant 50 under the same gravitational environments as those in the verification tests and under an inertia force condition induced by acceleration was analyzed by using computational fluid dynamics simulation (CFD simulation).

Figure 7:
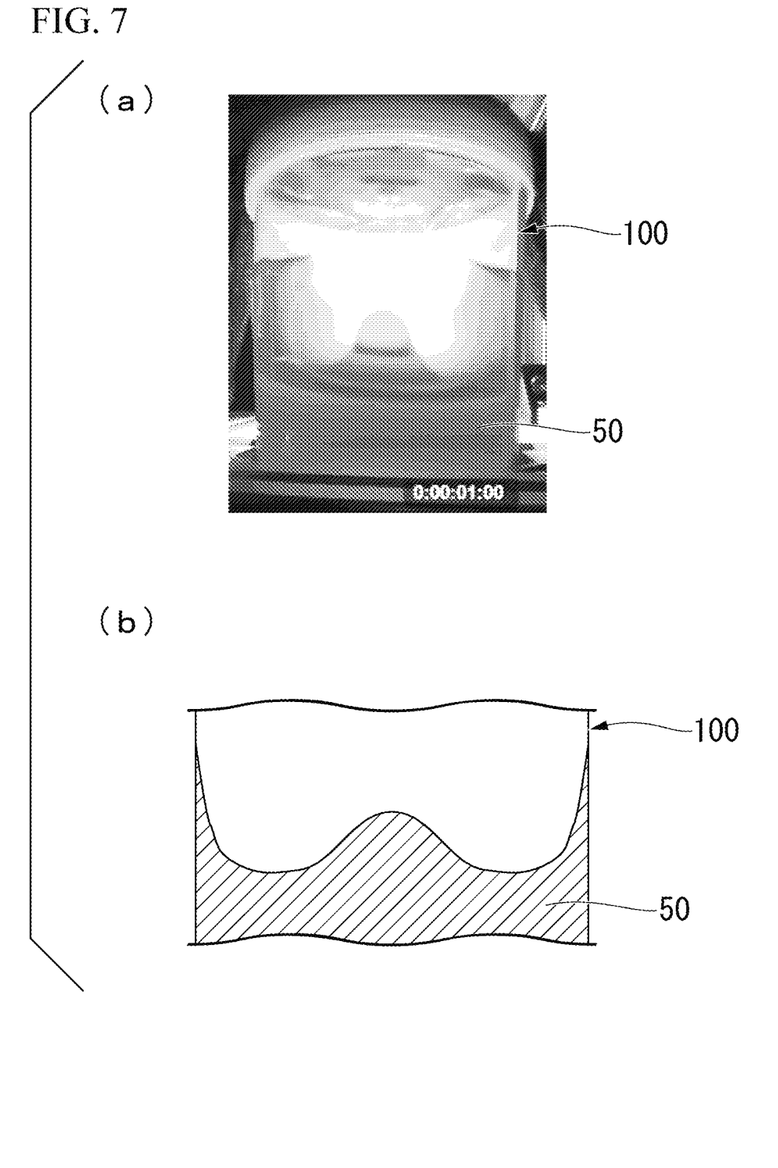
FIG. 7(a) is a view showing the result of a verification test and FIG. 7(b) is a view showing the result of computational analysis on the behavior of a liquid in a first comparative example.

As a result, in the liquid container 100 according to the first comparative example, as shown in FIG. 7, in both of the verification test and the computational analysis, it was confirmed that the behavior of the liquid propellant 50 changed significantly.

Specifically, it was confirmed that a central portion of the liquid propellant 50 in the radial direction rose significantly toward the top portion side and an outer peripheral part of the liquid propellant 50 moved toward the top portion side along the inner surface of the liquid container 100. In addition, it was confirmed that the position of the gas-liquid interface of the liquid propellant 50 in the axial direction differed significantly depending on the position thereof in the radial direction. Then, it was confirmed that both results of the verification test and the computational analysis were the same.

Figure 8:
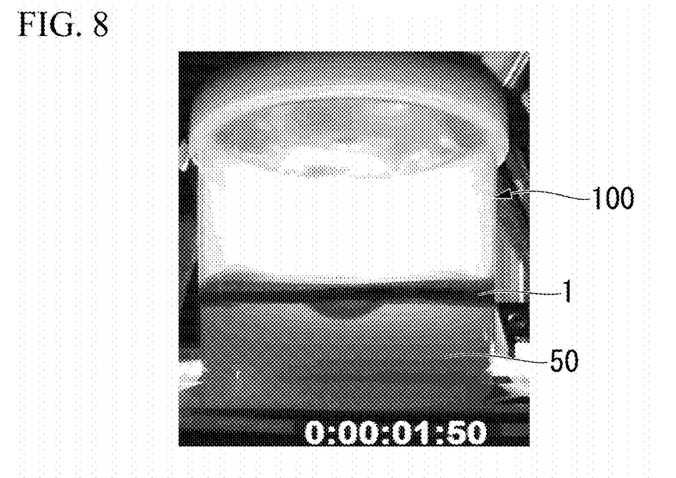
FIG. 8 is a view showing the behavior of the liquid in a first example.

On the other hand, in the liquid container 100 according to the first example, as shown in FIG. 8, it was confirmed that the behavior of the liquid propellant 50 was suppressed.

Specifically, it was confirmed that the gas-liquid interface of the liquid propellant 50 which was positioned at the same position as that of the opening 11 of the liquid behavior suppression device 1 was recessed toward the bottom side by the surface tension and an outer peripheral part of the liquid propellant 50 was raised toward the top portion side by the surface tension.

Figure 9:
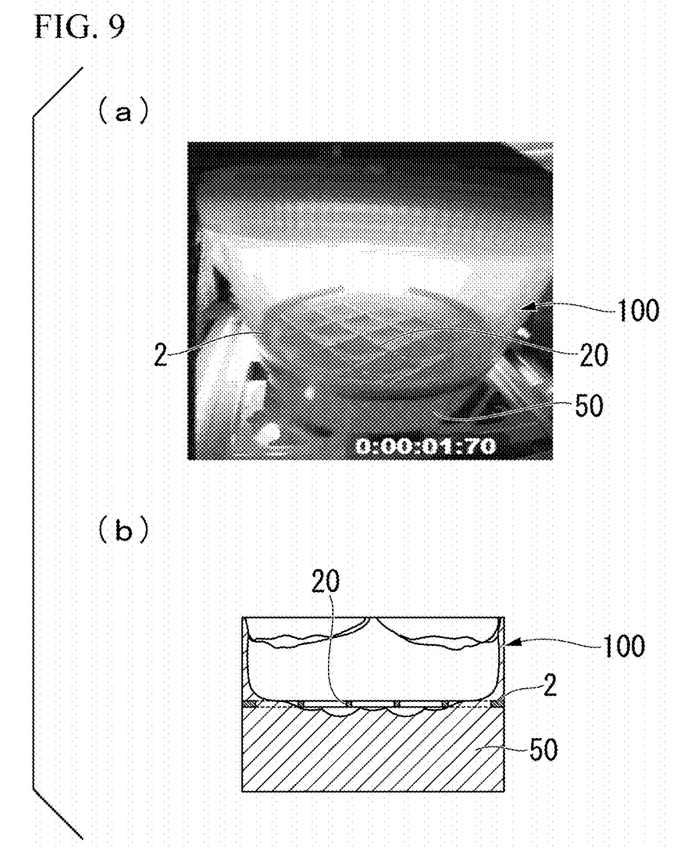
FIG. 9(a) is a view showing the result of a verification test and FIG. 9(b) is a view showing the result of computational analysis on the behavior of the liquid in a second example.

In addition, also in the liquid container 100 according to the second example, as shown in FIG. 9, in both of the verification test and the computational analysis, it was confirmed that the behavior of the liquid propellant 50 was suppressed.

Specifically, it was confirmed that a central portion of the liquid propellant 50 in the radial direction was slightly recessed toward the bottom side and an outer peripheral part of the liquid propellant 50 moved toward the top portion side along the inner surface of the liquid container 100.

Incidentally, the central portion of the liquid propellant 50 in the radial direction was recessed toward the bottom side, and the gas-liquid interface formed into a curved shape was recessed by the surface tension σ in the holes 30. It can determined that the behavior of the liquid propellant 50 is suppressed due to the occurrence of the surface tension σ which is caused by the operation of the present invention. Then, it was confirmed that both results of the verification test and the computational analysis were the same.

As described above, in both of the liquid behavior suppression device 1 according to the first embodiment and the liquid behavior suppression device 2 according to the second embodiment, the effect of suppressing the behavior of the liquid was confirmed.

Subsequently, the verification result of the foregoing effect in the third embodiment will be described.

In this verification test, the liquid container 100 in which the liquid behavior suppression device 3 according to the third embodiment was arranged was adopted as a third example.

Then, it was assumed that the spacecraft equipped with the liquid container 100 turned under the microgravitational environment to receive the inertia force which was induced by acceleration in the direction intersecting the axial direction, and the behavior of the liquid propellant 50 when the inertia force which was induced by acceleration from one side T1 toward the other side T2 in the turning direction T was exerted on the liquid container 100 was analyzed by using the CFD simulation.

Figure 10:
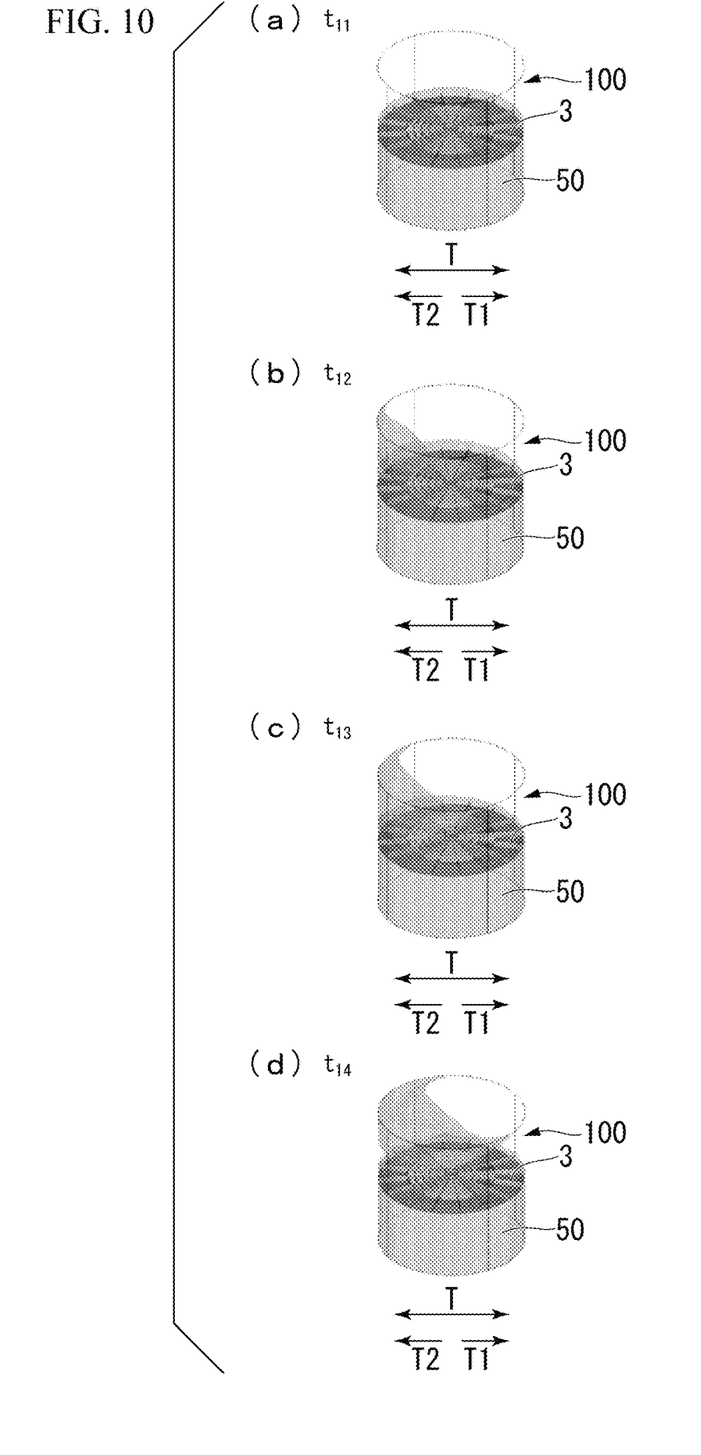

As a result, in the liquid container 100 according to the third example, as shown in FIG. 10, it was confirmed that the behavior of the liquid propellant 50 was suppressed. In the following description, it is assumed that time elapses in order of $t_{11}$ seconds, $t_{12}$ seconds, $t_{13}$ seconds, and $t_{14}$ seconds from the start of turning.

Specifically, as shown in each of FIG. 10(*a*) to FIG. 10(*d*), after $t_{11}$ seconds, after $t_{12}$ seconds, after $t_{13}$ seconds, and after $t_{14}$ seconds from the start [zero second] of the turning operation, the state of the liquid propellant 50 which has moved to the top portion side of the liquid container 100 changes every moment; however, the liquid propellant 50 which is positioned on the bottom side of the liquid container 100 maintains a state of being constantly held on the bottom side. In particular, it is recognized that the gas is prevented from flowing to the bottom side due to the surface tension σ which is exerted on the gas-liquid interface positioned in the holes 30, which is the foregoing effect of the holes 30.

As described above, it was confirmed that the liquid behavior suppression device 3 according to the third embodiment had the effect of suppressing the behavior of the liquid with respect to the inertia forces which were induced by acceleration not only in the axial direction but also in the direction intersecting the axial direction.

Incidentally, the technical scope of the present invention is not limited to the foregoing embodiments, and various changes can be made without departing from the concept of the present invention.

For example, in the foregoing embodiments, the liquid behavior suppression devices 1 to 3 which is arranged in the liquid container 100 accommodating the liquid propellant 50 for the spacecraft have been described as examples; however, the present invention is not limited to the aspects.

Apart from that, the foregoing configuration elements according to the embodiments can be appropriately replaced with well-known configuration elements as long as the replacement does not depart from the concept of the present invention, and the foregoing modified examples may be appropriately combined together.

INDUSTRIAL APPLICABILITY

According to the foregoing liquid behavior suppression devices, it is possible to suppress the behavior of the liquid.

REFERENCE SIGNS LIST 1, 2, 2B, 3, 4: Liquid behavior suppression device
10, 20, 30: Hole
21, 31: Annular portion
50: Liquid propellant
100: Liquid container

The invention claimed is:

1. A liquid behavior suppression device that partitions an inside of a liquid container in a direction orthogonal to a central axis and holds a liquid on a bottom side of the liquid container,
wherein a plurality of holes are formed to penetrate the liquid behavior suppression device in an axial direction, and
wherein, among the plurality of holes, opening areas of the holes that are positioned on one side in a radial direction, are smaller than opening areas of the holes, which are positioned on the other side in the radial direction.

2. The liquid behavior suppression device according to claim 1,
wherein the plurality of holes are arranged in a mesh pattern in a radial direction in the liquid container.

3. The liquid behavior suppression device according to claim 1, further comprising:
an annular portion that is arranged in an outer peripheral edge portion of the liquid behavior suppression device to extend along the outer peripheral edge portion.

4. The liquid behavior suppression device according to claim 1,
wherein the plurality of holes are arranged to form a radial pattern around the central axis.

5. The liquid behavior suppression device according to claim 1,
wherein sizes of the plurality of holes in a radial direction differ from each other.

6. The liquid behavior suppression device according to claim 1,
wherein sizes of the plurality of holes in a circumferential direction differ from each other.

* * * * *